US008760001B2

(12) United States Patent
Schaefer

(10) Patent No.: US 8,760,001 B2
(45) Date of Patent: Jun. 24, 2014

(54) SUPPLYING CIRCUIT FOR THE ELECTRICAL SUPPLY OF A VEHICLE

(75) Inventor: Detlev Schaefer, Dexheim (DE)

(73) Assignee: GM Global Technology Operations LLC, Detroit, MI (US)

(*) Notice: Subject to any disclaimer, the term of this patent is extended or adjusted under 35 U.S.C. 154(b) by 505 days.

(21) Appl. No.: 13/073,127

(22) Filed: Mar. 28, 2011

(65) Prior Publication Data
US 2011/0241421 A1 Oct. 6, 2011

(30) Foreign Application Priority Data

Mar. 30, 2010 (DE) .................. 10 2010 013 569

(51) Int. Cl.
*B60L 1/00* (2006.01)
*B60L 3/00* (2006.01)
*H02G 3/00* (2006.01)
*B60K 6/448* (2007.10)

(52) U.S. Cl.
USPC .................. 307/9.1; 307/10.1; 180/65.24

(58) Field of Classification Search
None
See application file for complete search history.

(56) References Cited

U.S. PATENT DOCUMENTS

| 6,088,638 | A | 7/2000 | Behrends et al. | |
|---|---|---|---|---|
| 6,097,109 | A | 8/2000 | Fendt et al. | |
| 7,236,893 | B2 | 6/2007 | Gross et al. | |
| 2001/0035685 | A1* | 11/2001 | Tamai et al. | 307/10.1 |
| 2001/0052728 | A1* | 12/2001 | Larsson et al. | 307/9.1 |
| 2006/0097671 | A1 | 5/2006 | Yoshida | |
| 2006/0243502 | A1* | 11/2006 | Weber et al. | 180/65.3 |
| 2010/0060080 | A1* | 3/2010 | Sawada et al. | 307/48 |
| 2010/0136379 | A1* | 6/2010 | King et al. | 429/23 |

FOREIGN PATENT DOCUMENTS

| DE | 4028242 | A1 | 3/1992 |
|---|---|---|---|
| DE | 19734598 | C1 | 2/1999 |
| DE | 19746546 | C1 | 3/1999 |
| DE | 10251589 | A1 | 5/2004 |
| DE | 10255433 | A1 | 6/2004 |
| DE | 102006010713 | A1 | 9/2007 |
| DE | 102007017187 | A1 | 10/2008 |
| EP | 1013506 | A2 | 6/2000 |

OTHER PUBLICATIONS

German Patent Office, German Search Report for German Application No. 102010013569.0, dated Dec. 27, 2010.

* cited by examiner

*Primary Examiner* — Jared Fureman
*Assistant Examiner* — Aqeel Bukhari
(74) *Attorney, Agent, or Firm* — Ingrassia Fisher & Lorenz, P.C.

(57) ABSTRACT

A supply circuit is provided for the electrical supply of a vehicle. Here, a battery for generating a battery supply voltage and a step-up converter for generating an intermediate voltage from the battery supply voltage are provided. A temporary store is supplied from the intermediate voltage and serves for storing electrical energy. A step-down converter for generating a first consumer voltage for supplying a first consumer from the intermediate voltage and a second step-down converter for generating a second consumer voltage for supplying a second consumer from the intermediate voltage are provided. A control circuit serves to control the step-up converter, the first step-down converter and the second step-down converter.

14 Claims, 1 Drawing Sheet

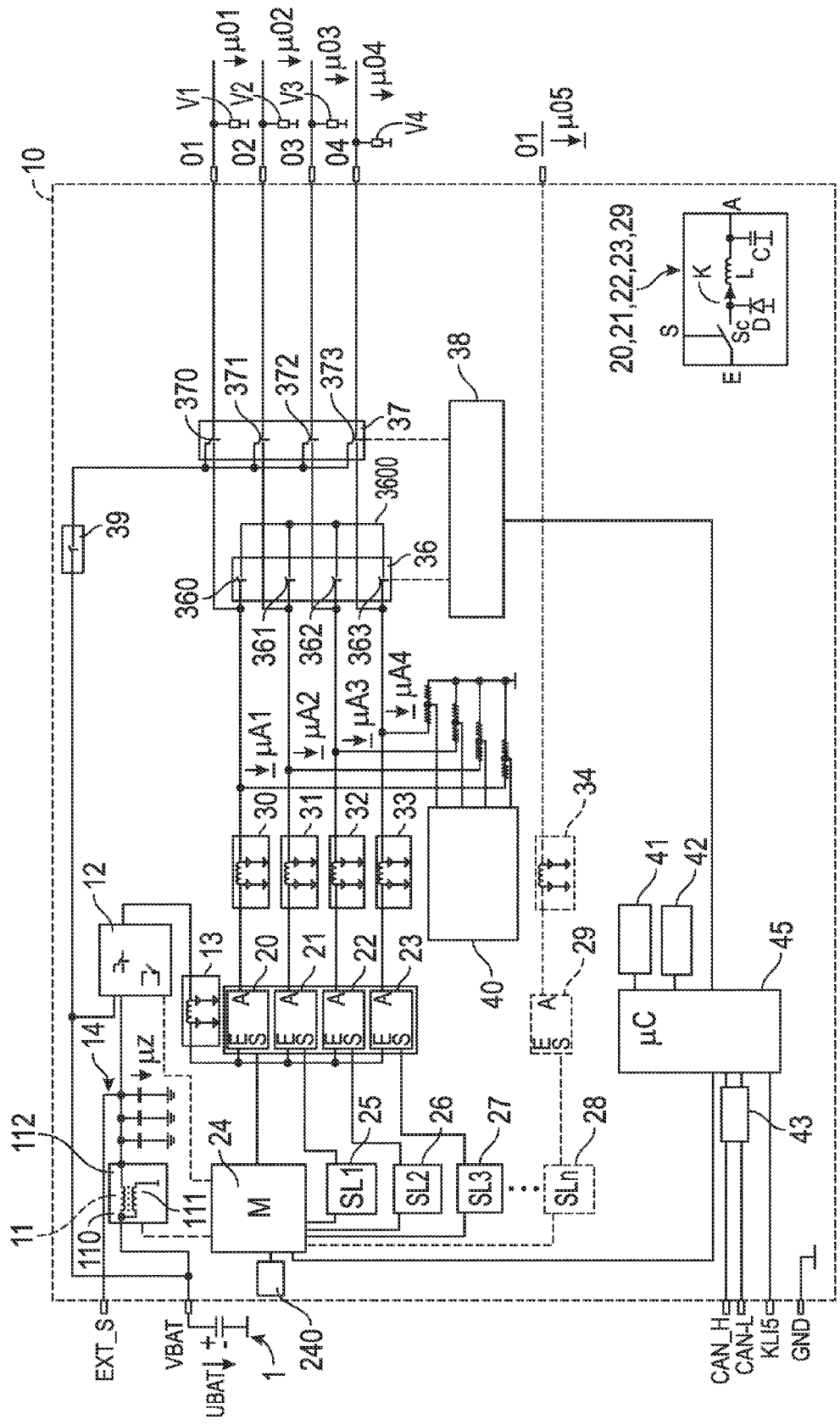

SUPPLYING CIRCUIT FOR THE ELECTRICAL SUPPLY OF A VEHICLE

CROSS-REFERENCE TO RELATED APPLICATION

This application claims priority to German Patent Application No. 102010013569.0, filed Mar. 30, 2010, which is incorporated herein by reference in its entirety.

TECHNICAL FIELD

The application relates to a supply circuit for the electrical supply of a vehicle. Vehicles with internal combustion engines usually have a lead accumulator which is charged during travel and supplies the consumer of the vehicle with electrical energy. The term "battery" is used below as being synonymous with the term "accumulator".

BACKGROUND

Through the fact that in the meantime several different consumers are integrated in a vehicle, the consumption of electrical power in the vehicle increases. In order to continue to provide a reliable current supply, U.S. Pat. No. 7,236,893 B1 proposes dividing current consumers into safety-critical and less safety-critical, and to make the less safety-critical consumers capable of being switched off.

Nevertheless, it is still critical to supply consumers with the voltage supply during the starting-up of the engine, because the battery voltage drops sharply.

It is therefore at least one object to provide a supply circuit for a vehicle which also provides sufficient energy for consumers in critical situations, in particular on starting up an engine.

SUMMARY

According to the application, a supply circuit is provided for the electrical supply of a vehicle. A battery serves for the generation of a battery supply voltage and a step-up converter is provided for generating an intermediate voltage from the battery supply voltage. A temporary store for storing electrical energy is supplied from the intermediate voltage. The supply circuit has in addition a first step-down converter for generating a first consumer voltage for supplying a first consumer from the intermediate voltage. A second step-down converter is provided for generating a second consumer voltage for supplying a second consumer from the intermediate voltage. A control circuit serves to control the step-up converter, the first step-down converter and the second step-down converter.

The supply circuit makes it possible that the individual consumers are supplied with electrical energy by means of the individual step-down converters. The temporary store has the advantage that energy which is obtained for example during the recovery of a vehicle is stored in the temporary store. By the configuration with a step-up converter and step-down converter, it is made possible that the temporary store is charged to a higher voltage than the battery voltage. It is thereby possible to store as much electrical energy as possible in the temporary store.

Therefore, for example during the starting-up process of the engine, consumers which would normally be supplied with an only insufficiently high battery voltage, can be supplied by means of the energy from the temporary store by the step-down converter.

The supply circuit can stabilize the supply voltage, without this having a negative influence on the starting-up process and without the current which is taken from the battery being reduced, because stored energy is used. Decentral voltage supplies were also proposed, in which local direct current choppers, distributed in the vehicle, respectively supply individual consumers with electrical energy. It has been found that a decentral voltage supply can lead to the decentral direct current choppers requiring a particularly large amount of current for their consumers on starting-up. Thus, the battery voltage, which is already lowered by the starting-up process, drops additionally, because then energy flows to the individual consumers. Decentral controls can therefore tend to further intensify voltage drops particularly on starting up the engine.

In an embodiment, a first switch is provided for connecting a supply node of the first consumer voltage with a supply node of the battery voltage, and a second switch is provided for connecting a supply node of the second consumer voltage with a supply node of the battery voltage. Thereby, in selected modes of operation, a consumer or several consumers can be supplied directly from the battery. Slight losses will occur here compared with the supply by the step-down converters. Therefore, in particular modes of operation, the consumers can be supplied directly from the battery, whereas in other modes of operation, consumers are supplied from the step-down converters.

In a further embodiment, a further switch is provided for connecting a supply node of the first consumer voltage with a supply node of the second consumer voltage. By connecting this switch, the first step-down converter and the second step-down converter can be connected in parallel, so that for example a consumer is supplied by the two step-down converters. This increases the power which can be provided for this consumer.

The control circuit can have a superordinate control and two subordinate controls, wherein a first subordinate control actuates the first step-down converter and the second subordinate control actuates the second step-down converter. The superordinate control actuates here the first subordinate control and the second subordinate control.

With such a configuration of superordinate control and subordinate controls, a plurality of data can be processed. Data, for example concerning the status of the battery, the estimated loads of the supply systems and similar data can be evaluated in the superordinate control. The superordinate control then decides which step-down converters are to be switched off and which further switches are to be connected through. The superordinate control actuates the subordinate controls accordingly. The subordinate controls are then only involved with the task of respectively actuating one of the step-down converters. This has advantages with respect to a fully centralized solution, in which only a central control has to actuate all the step-down converters. Such a central control could not prioritize the tasks sufficiently, so that not enough calculation time would be available for the actuation of the step-down converters.

By a further switch for connecting a supply node of the battery voltage with a supply node of the intermediate voltage, the store can be supplied directly from the battery. This is advantageous for example in the rest modes of the vehicle, when it is foreseeable that the vehicle is not going to be used in the next few weeks. In this case, the temporary store can be supplied directly from the battery. If the temporary store contains capacitors, these can therefore be kept at a voltage level which prevents an accelerated aging of the capacitors.

If a housing is provided to receive the supply circuit and the housing has a connection for an external temporary store, the temporary store can be provided partially in the housing and partially outside the housing. Thereby, an upgradable supply circuit is produced. If in larger vehicles or with a larger number of consumers in the vehicle larger temporary stores are required for the intermediate voltage, the temporary store can be connected in parallel outside the housing in addition to the temporary store which is present in the housing. The housing with the supply circuit situated therein can therefore be used both for small and for large vehicles.

With a test circuit for measuring the first consumer voltage and the second consumer voltage, a check can be carried out as to whether the first step-down converter and the second step-down converter are fully functional and whether the consumers are supplied with the desired voltage levels.

The supply circuit can also have a third step-down converter for generating a third consumer voltage to supply a third consumer from the intermediate voltage, wherein the voltage level of the third consumer voltage is able to be set independently of the first consumer voltage and independently of the second consumer voltage. It is thereby possible to supply individual consumers with a variable voltage level. This can be expedient so that a consumer reduces its power consumption.

The embodiments of the invention also relate to a vehicle with a supply circuit. Preferably the supply circuit is provided here at a relatively cool location in the vehicle, for example in the vicinity of the wheel housing. However, attention must be paid here that the supply circuit is protected against splash water. In contrast, it is comparatively warm in the engine compartment; particularly the use of supercaps as a temporary store would be problematic here, because supercaps are usually sensitive to temperature.

The embodiments of the invention also relate to a method for operating a presented supply circuit, in which in an operating mode, preferably during the automatic starting up of the drive motor of the vehicle, the first consumer is connected to the first consumer voltage and the second consumer is connected to the second consumer voltage. Thereby, each of the consumers is supplied individually from precisely one step-down converter. This mode of operation is suitable in particular for a starting-up phase, in which the temporary store is already charged. It is advantageous here that on starting up, the first consumer and the second consumer are not supplied directly from the battery.

In an embodiment of a method, there is in addition an operating mode in which the first consumer is supplied from the first consumer voltage and at the same time from the second consumer voltage. The first step-down converter generates the first consumer voltage here and the second step-down converter generates the second consumer voltage. Thereby, step-down converters can be bundled together and the first consumer can be supplied by means of the first and the second step-down converter. This second operating mode is particularly suited for example when a door lock mechanism must be reliably supplied in an emergency, for example after an accident, so that the door opens.

In a further embodiment of the method, the first consumer is supplied from the battery voltage and the second consumer is supplied from the battery voltage. In an embodiment, the temporary store is also supplied from the battery voltage.

The presented voltage supply is intended to make possible an electrical energy supply which can fulfill the following requirements. By means of a high speed CAN interface, data can be transmitted concerning the start-up, concerning power requirements, concerning the activity of an automatic start-stop system and the status of the engine. A non-volatile store serves for calibrating the voltage supply circuit and for storing codes for fault detection and diagnosis of the voltage supply circuit. Malfunction messages can be indicated to the driver via a display or via instruments in the instrument panel. The consumers are prioritized in the form of an intelligent energy management system, and consumers are selected depending on the battery status of the prevailing current consumption, a priority list and the status of the running engine.

There are substantially three output stage modes which characterize the supply of a consumer. In the first mode, the consumer is decoupled, i.e., it is not operated by any voltage supply. In the so-called bridged state, it is supplied from the battery and in the stabilized state, it is supplied from one of the step-down converters.

The temporarily stored energy is stored to a higher voltage level by means of internal or external capacitors. The energy is charged in particular in the case of recovery on braking or in coasting mode. It can also be considered to use lithium-ion batteries as external stores, in order to utilize intelligent charging methods with them.

It is also possible to charge the capacitors via an external energy source.

Discrete output stages are used, i.e., each output stage has a maximum performance level. It is possible to cascade the stages, so that higher performance requirements can be served with shared performance requests.

Different output voltages can be programmed. In addition, different maximum output currents can be programmed. The circuits can partially undertake the function of electrical cutouts. The internal diagnostic and monitoring elements can be tested by means of an operating tool. The integration of the voltage supply should thereby be ensured for all vehicles, by the supply circuit being protected against a penetration of water. The housing is optimized to the effect that the supply circuit is cooled as well as possible.

Therefore, an intelligent dc-dc converter is provided for integration into the energy management. A particular field of use is stop/start vehicles which have particularly high requirements with regard to the state of charge of the battery. Components which are particularly susceptible to voltage drops are supported by the converter directly from the battery or by energy which is previously additionally stored in integrated stores. Decisions for the energy use and provision are carried out here as a function of the status of the programmed vehicle electrical system.

The converter is upgradable by the capability of making available additional external energy stores to those already integrated, via a line connection. The converter is to make available a maximum base performance of 500 W over a defined period of time.

In an embodiment, the converter is connected directly with the HV-CAN bus of the vehicle for direct communication with the BCM (Body Control Module)/ECM (Engine control module). It decides on the distribution of the necessary and the available energy by the reading-in of battery characteristics from the intelligent battery sensor (State of Function (SOF), State of Charge (SOC), battery voltage level, etc.), from the BCM (battery-brake-signal bit, ignition on, consumer performance requirement, emergency performance requirement) from the ECM (engine speed, engine running, start-up requirement, autostart bit). For safety functions, the accident detection signal and a battery separation detection (battery destroyed function) are to be taken into consideration by the dc-dc converter.

The following therefore results from embodiments: reduction of the electrical energy to be generated from fossil fuels by the storing of kinetic energy in additional storage elements, e.g., ultracaps or LIIO batteries, during the braking process with a high charging current or in decelerations with a low charging current; prevention of load reactions, such as occur in standard dc-dc converters at higher performances from approximately 500 W; relieving and supporting the start process by load de-coupling and direct support from storage elements which are used to a higher voltage level; safety functions and priority lists stored in the converter help to prevent malfunctions of control equipment and components; positive influence on the $CO_2$ reduction.

The new converter stores additional energy from existing kinetic reserves and at the same time manages the energy provision to the consumers.

If, in the case of an automatic start, the starting-up process lasts shorter than approximately 5 seconds and therefore consumers are supplied from the temporary store for a time shorter than approximately 5 seconds, it is assumed that the starting-up process was successful. The converter detects automatically whether a manual start or an automatic start is carried out and acts accordingly with regard to the supply control, without signaling a malfunction to the customer. If the consumers were supplied for approximately 5 seconds from the temporary store, it is assumed that the vehicle has a malfunction and the supply circuit switches all the consumers into the bridged state. This means that all the consumers are supplied directly from the battery voltage again.

An embodiment of the solution concerns an upgradable unit, which can be equipped in a modular manner by the provision of external energy stores. The variants can thereby be upgraded from a basic version up to a more powerful high-performance version. Through the electronic management of the supply, the necessity for cutouts, which would be necessary in a passive solution, is dispensed with. At the same time, a direct diagnosis of the supply paths, e.g., in the case of exceeding standby current, short-circuit or line break.

BRIEF DESCRIPTION OF THE DRAWINGS

The present invention will hereinafter be described in conjunction with the following drawing FIG. 1 that shows a circuit arrangement for the current supply of a vehicle.

DETAILED DESCRIPTION

The following detailed description is merely exemplary in nature and is not intended to limit application and uses. Furthermore, there is no intention to be bound by any theory presented in the preceding background or summary or the following detailed description.

FIG. 1 shows a circuit arrangement 10 for the current supply of a vehicle. The circuit arrangement is a supply circuit and has the function of an intelligent direct current chopper (dc-dc converter). The circuit arrangement 10 receives the voltage supply at its input connections VBAT and GND, in this case at the level of 12 V, which is provided from a lead accumulator 1. The circuit arrangement 10 has a step-up converter 11, which contains a transformer 110, a switch 111 and a diode 112.

The transformer 110 contains two coils, which are wound over a shared core. A first coil is provided between the connection VBAT and a first connection of the switch 111, the second connection of which is connected to ground. The second coil is provided between the connection VBAT and the anode of the diode 112. The cathode of the diode 112 is connected with the first plates of capacitors 14 which are connected in parallel, whilst the second plates of the capacitors 14 are respectively connected to ground. The first plates of the capacitors 14 are additionally connected with a first input of the switch unit 12, the second input of which is connected with the connection VBAT. The first plates of the capacitors are also connected with an input EXT_S of the circuit arrangement 10, to which external capacitors, i.e., capacitors outside a housing, which comprises the circuit arrangement 10, can be provided parallel to the capacitors 14. The capacitors 14 and any external capacitors which may be present form a temporary store. The voltage which is available via the capacitors 14 is also designated as intermediate voltage.

The output of the switch unit 12 is connected with a first connection of a filter 13, which consists of two capacitors and a coil. The coil is provided between the input and output of the filter 13, whilst a first capacitor is provided between the input and ground and the other capacity is provided between the output of the filter 13 and ground. The output of the filter 13 is connected with inputs of five step-down converters 20, 21, 22, 23 and 29.

Each of the step-down converters 20, 21, 22, 23 and 29 contains an input E, a switching input S and an output A. In addition, each of the step-down converters contains a switch Sc, a diode D, a coil L and a capacitor C. The switch Sc is provided with its connections for the load path between the input E and an intermediate node K. The switching input of the switch Sc is connected with the switching input S. The coil is provided between the node K and the output A. The cathode of the diode D is connected with the node K and the anode of the diode D is connected to ground. The capacitor C is provided between the output and ground, and the anode of the diode of this step-down converter.

The switching arrangement 10 contains a superordinate control unit 24, a first subordinate control unit 25, a second subordinate control unit 26, a third subordinate control unit 27 and an nth subordinate control unit 28. The superordinate control unit 24 actuates the control connection of the switch of the step-down converter 20. The superordinate control unit 24 additionally actuates the subordinate control units 25, 26, 27 and 28. The subordinate control unit 25 is connected with the control connection of the switch of the step-down converter 21, the output of the subordinate control unit 26 is connected with the control connection of the switch of the step-down converter 22, the output of the subordinate control unit 27 is connected with the control connection of the switch of the step-down converter 23 and the control connection of the switch of the step-down converter 29 is connected with the output of the subordinate control 28. The superordinate control 24 also controls the step-up converter 11 and the switch unit 12.

The circuit arrangement 10 has, in addition, filters 30, 31, 32, 33 and 34. These have respectively an input and an output, a coil between the input and output and a capacitor between the input and ground, and a further capacitor between the output and ground.

In addition, the circuit arrangement 10 contains a bridging arrangement 36 with a first switch 360, a second switch 361, a third switch 362 and a fourth switch 363.

In addition, the circuit arrangement 10 contains a first supply switch 39, a second supply switch 370, a third supply switch 371, a fourth supply switch 372 and a fifth supply switch 373. The first supply switch 39 is connected by its first input with the connection VBAT and by its second connection to respectively the first input connections of the supply switches 370, 371, 372 and 373. The supply switches 370,

371, 372 and 373 are respectively selector switches, which connect their output optionally either with their first input or with their second input.

The input of the filter 30 is connected with the output of the step-down converter 20, whilst the output of the filter 30 is connected with the second input of the switch 370. The input of the filter 31 is connected with the output of the step-down converter 21, whilst the output of the filter 31 is connected with the second input of the switch 371. The input of the filter 32 is connected with the output of the step-down converter 22, whilst the output of the filter 32 is connected with the second input of the switch 372. The input of the filter 33 is connected with the output of the step-down converter 23, whilst its output is connected with the input of the switch 373. The output of the switch 370 is connected with the output of the circuit arrangement 10.

The circuit arrangement 10 has in addition the outputs O2, O3, O4 and O5. The output O2 is connected with the output of the switch 371, the output O3 is connected with the output of the switch 372, the output O4 is connected with the output of the switch 373 and the output O5 is connected with the output of the filter 34. The input of the filter 34 is connected with the output of the step-down converter 29.

The said switches 370, 371, 372, 373, 360, 361, 362 and 363 are actuated with their control input respectively by the electronic switch driver 38.

The circuit arrangement 10 has a bridge node 3600, which is connected with the second connections of the switches 360, 361, 362 and 363. The first connection of the switch 360 is connected with the output of the filter 30, the first connection of the switch 361 is connected with the output of the filter 31, the second connection of the switch 362 is connected with the output of the filter 32 and the first connection of the switch 363 is connected with the output of the filter 33.

Generally in switches, the connections of the load path of the switch are designated as connections, inputs and outputs; this means that with a closed switch and with available voltage via the connections, current flows through the connections, inputs or respectively outputs. The switches are controlled via switching connections, which indicate in which position the switch is to be situated.

The filters 13, 30, 31, 32 and 33 have the purpose of protecting the voltage supply in the case of the filter 31 or respectively the consumers in the case of the filters 30, 31, 32 and 33, from electrical noise.

Series connections of respectively two resistors are additionally provided to the outputs of the filters 30, 31, 32, and 33, between these outputs and ground. At the connection site between the two resistors, a node is respectively provided, which is connected respectively with one of the inputs of the feedback circuit 40, so that each of the inputs of the feedback circuit 40 is connected with precisely one node between two resistors of one of the series connections. This feedback circuit 40 contains voltage measurement circuits, which measures the voltage at the said nodes and emits the result of this measurement to the superordinate control 24. The circuit arrangement 10 has, in addition, a microcontroller 45, a CAN-bus decoder 43, a volatile store 41 and a non-volatile store 42.

The circuit arrangement 10 receives the signals CAN_H and CAN_L, which are decoded by the CAN-bus decoder 43 and passed on to the microcontroller 45. The microcontroller 45 also receives the signal KL15 received from the circuit arrangement (10). The microcontroller 45 actuates the superordinate control 24 and the electronic switch driver 38. The signal KL15 serves for the rapid initializing of the intelligent converter. This is a possibility which is realized in hardware to waken the converter from the sleep mode, in which it is to receive a negligible standby current of less than 100 A.

The above-mentioned switches are embodied as power transistors, for example as power MOSFETs or IGBTs.

The switch unit 12 switches the first input, which is connected with the connection VBAT, or the second input, which is connected with the first plates of the capacitors 14, to its output. The switch unit 12 can also connect its two inputs with each other and, in so doing, switch its output with high impedance.

The circuit arrangement 10 can be used in vehicles with internal combustion engine operation, in vehicles with hybrid drive or in vehicles with pure electric drive. The following signals are directed via the CAN-bus, i.e. via the connections CAN_H and CAN_L, to the microcontroller 45 and are used for the internal evaluation and the decision finding within the circuit arrangement 10. The signal SOF (State of Function) is a value in the Volt unit, which is determined by an external computer. Behind this is the maximum voltage drop, which was calculated in advance, of the 12 V vehicle electrical system during the starting process. The signal SOC (State of Charge) is the value by which the state of charge of energy stores is indicated in percentage. The state of charge and the temperature, and also the aging determine definitively the start stability of the energy store.

In addition, the microcontroller 45 receives the battery voltage, the brake signal bit, which is either false or true. The brake signal bit is not used when the engine speed is below a predetermined threshold. In addition, the "engine running bit", which can likewise be either true or false, the signal "automastart bit", which can likewise accept the values false or true, ignition on, which is initialized by means of the CAN-bus or via its own line, are transmitted. In addition, the signals "start-up requirement" and "performance requirement of consumers" are used, with these two signals being sent via the CAN-bus.

The signals "emergency requirement for door closing systems" and "defective battery, battery off or damaged" are also evaluated by the microcontroller 45.

The circuit arrangement 10 collects this said data during each ignition cycle and, before the circuit arrangement is switched into a standby mode, stores the data in the non-volatile store 42. If the data which come from a battery control apparatus which controls the battery 1 are invalid, a portion of the energy management can be used in order to decide which consumers are to be connected to the battery, before the engine runs. The first operating mode, also designated Mode I, is the start mode. The vehicle is in this when, after a standstill with the ignition switched off, the ignition key is turned to start the vehicle and the engine is not yet started. In this mode, the microprocessor charges the data stored in the non-volatile store and receives the above-mentioned signals in order to determine which consumers are connected with the battery. In those consumers which are connected with the battery, the associated supply switch 370, 371, 372 or 373 is switched so that its first input is connected with its output. In addition, the supply switch 39 is closed.

An automatic starting process within an automatic start-stop system can only be initialized when the autostart bit is set to true. It is assumed that the autostart bit is only set to true when the first manual starting-up of the engine was carried out successfully within the first ignition attempt. Otherwise, the autostart bit is set to false, because then there is an increased risk that an automatic starting-up will not take place at the first go. The autostart bit is likewise set to false when the ignition is off. The autostart bit can also be set to false by means of a switch which can be operated by hand, or by safety devices in the vehicle. The circuit arrangement 10 uses components which limit specific function voltages and limit the start-up voltage, in order to ensure correct behavior of the power supply.

The manual starting process, which is designated below as Mode II, is initialized by a user who turns the ignition key up to the stop or presses a starting button in the vehicle, in order to start the engine. The autostart bit signal is set to false, because the autostart was previously deactivated either manually or automatically. The switch 39 is closed and some of the switches 370, 371, 372 and 373 are respectively switched so that their respective first inputs are connected with their respective first outputs. Therefore, a selection of the consumers V1, V2, V3 and V4, which are connected to the outputs O1, O2, O3 or O4, is respectively supplied from the battery 1 directly via the said switches 39, 370, 371, 372 or respectively 373 from the battery voltage.

The circuit arrangement 10 receives from the ignition key the signal that the engine is to be started. According to the signals SOF and the SOC and the priority list, the voltage arrangement decides, before starting, a) which consumers are to be switched off and b) which consumers are energized directly from the battery, without this having a negative influence on the starting-up process. A load calculation is carried out for this. In addition, a decision is made, c) which components will be switched on, after the engine will have been successfully started up.

For example, the consumer V1, which is supplied from the output O1, is to be energized directly from the battery, and the consumer V2, which is connected to the output O2, is to be switched off. For this, the switch 39 is closed and the switch 370 is thrown so that it connects its first input with its output. The second switch 371 is switched so that its second input is connected with the output. The switch 361 remains opened and the step-down converter 21 is inactive. Therefore, the consumer, which is connected to the connection O2, is not supplied.

The so-called autostart process is designated as Mode III. The autostart process is the automatic starting-up of the engine, without the user having to initiate the starting-up. The autostart process is necessary in particular in an automatic start-stop system, in which the engine is switched off when stopped at a stoplight. By pressing the coupling, the engine is automatically started again, without the driver having to turn an ignition key or push a starting button. The autostart bit is set to true at the start of the process. If the capacitors 14 are not charged to a higher voltage, but rather to the same voltage as the battery, the comparator switches into the so-called bridged mode and the circuit arrangement operates as in Mode II.

If the capacitors 14 are charged to higher voltage than the battery—this is effected for example by recovery in the past—the switch unit 12 is set so that the inputs of the step-down converters 20, 21, 22 and 23 are coupled via the filter with the first plates of the batteries 14.

According to the charging status of the capacitors 14, the signals SOC and SOF and the priority list, the circuit arrangement 10 decides which consumers are charged from the stored energy in the capacitor 14. This takes place by means of a load calculation, in which it is estimated how much energy the individual consumers are likely to consume. In addition, it is calculated whether it is necessary to cascade several outputs of the step-down converters 20, 21, 22 and 23, for example because the charge status of the battery is poor.

In an example, the consumers V1, V2, V3 are to be supplied respectively from a step-down converter, whilst the consumer V4 is not to be supplied. The switch 39 is opened, as well as the switches 360, 361, 362 and 363. The switches 370, 371 and 372 are respectively switched so that their second inputs are connected with their output, whilst the switch 373 is switched so that its first input is connected with the output.

In Mode III a decision is also made as to which consumers, which are not absolutely necessary for the operating mode of the vehicle, are nevertheless supplied so as not to disappoint the user of the vehicle.

Mode IV is the recovery mode. The circuit arrangement 10 has the possibility of storing energy during a vehicle braking or during a deceleration process of the vehicle. This energy is stored in the capacitors 14. In addition to the capacitors 14, which are parts of the circuit arrangement 10, further capacitors can be connected to the connection EXT_S, as mentioned above. These additional stores can be capacitors or accumulators or similar.

The energy which is converted into electrical energy on braking or on a deceleration of the vehicle is used firstly in order to increase the battery voltage. This energy is then converted by means of the step-up converter 11 into charging energy of the capacitors 14 or respectively of the additional external capacitors. The circuit arrangement 10 should use a step-up converter 11 which has low power dissipation, in order to achieve higher voltage values, so that more electrical energy can be stored in the temporary store, i.e. in the capacitors 14 and in the external store. The energy W is calculated from W=½*capacity*voltage2. The higher the voltage, the more energy can be stored.

Depending on the state of charge of the stored energy, this can also be used in order to additionally provide energy to components which have additional short-term power requirements. This additional energy must run through the internal energy management, in order to prevent the start-up supply being disturbed. Therefore, it is necessary to transmit the requirement of additional energy to the circuit arrangement 10 via the CAN-bus.

The recovered energy should be stored for a few weeks, by leakage currents being prevented while the vehicle is at a standstill and by capacitors with a low self discharge rate being used.

The emergency energy supply mode is designated as Mode V. Owing to the legal regulations concerning electrical door lock systems, an output of the supply circuit is provided only for the door locks with the exception of the trunk lock. This output has a higher priority. In the case where the battery voltage becomes too low, an accident was detected, the battery voltage is no longer there or the battery is destroyed, a battery malfunction is detected. The door locks must be actuated so that a decision is made between an emergency energy supply and a constant energy supply.

In order to prevent a malfunction within the circuit arrangement 10, the internal voltage supply must be guaranteed. For this, the control circuits, for example the microcontroller 45 and the controls 24, 25, 26, 27 and 28 are supplied in this case from an additional store, which was energized from a charge pump.

The circuit arrangement 10 reacts as follows: All the consumers which are not involved, i.e., all the consumers which are not necessary, are switched off. All the step-down converters 20, 21, 22 are bundled together via the switches 360, 361, 362 and 363 and supply the emergency connection with voltage. In addition, a request for door opening is sent to the doors via the CAN-bus.

It is assumed that the supply of the door locks takes place via the output O3. Thereupon, the switches 360, 361, 362, 363 are closed. The switch 372 is switched so that its second input is connected with its output, whilst the switches 370, 371 and 373 are switched so that their first inputs are respectively connected with their outputs. The switch 39 is opened. The step-down converters 20, 21, 22 and 23 are all operated. Consequently, all the energy flows from the step-down converters 20, 21, 22 and 23 to the output O3. The step-down converters 20, 21, 22 and 23 are therefore operated in parallel and the output power which is made available is greater than if only one of the step-down converters 20, 21, 22 and 23 were operated.

The so-called parking mode is designated as Mode VI. If a vehicle is parked for several weeks, for example at an airport, the energy consumption is to be lowered as much as possible. The capacitors 14 are charged directly from the battery. For this, the switch unit 12 connects its inputs with each other and switches its output with high impedance. The capacitors therefore remain charged to a lower voltage level, whereby increased aging processes, which would occur in still lower voltages, are prevented. At the same time, the self discharge currents, which rise with a rising voltage, are kept as low as possible.

In addition, the voltage supply 10 has programmable output connections for consumers with low voltage levels. These outputs can be used for bus systems and sensors with predetermined input voltage levels. One of these outputs is the output O5.

The programmability of the consumer voltage level is not used for the main supply outputs, which must all have the same voltage level. When the voltage supply can be reached, likewise by reducing the voltage levels at these outputs, this can only be carried out when all voltage levels are lowered at the same time.

The low voltage levels would have to be adapted to the requirements of the consumers which would be affected directly by this requirement. The step-down converter 29 can be set so that its output voltage varies. The output voltage of the step-down converters 20, 21, 22 and 23 are set respectively to the same output voltage value.

In order to convert energy, which is provided from the capacitors 14 and the battery, to a specific voltage level, the step-down converters are used. These step-down converters can be set for different performances, i.e. output currents and different voltage levels, by being programmed by software with regard to their output parameters. The four high-performance step-down converters 20, 21, 22 and 23 should provide respectively the same output voltage, so that it is possible to combine the outputs, in order to provide together the highest possible output power.

The step-up converter 11 is activated during the braking of the vehicle or during braking processes, so that the energy is stored respectively to a higher voltage level. This voltage level is, for example, 28 V. During the recovery, all the consumers should be connected directly with the battery. The voltage via the capacitors 14 is set within a minimum voltage level and a maximum voltage level. According to the voltage levels of the capacitors 40, consumers can be supplied with recovery energy, which comes directly from this step-down converter 11, without this having a negative influence later on the starting-up process.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A supply circuit for an electrical supply of a vehicle, comprising:
   a battery configured to generate a battery supply voltage;
   a step-up converter configured to generate an intermediate voltage from the battery supply voltage;
   a temporary store configured to store electrical energy and supplied from the intermediate voltage, wherein the supply circuit is disposed inside a housing, and wherein the temporary store comprises a first electrical energy storage internal to the housing and a second electrical energy storage external to the housing;
   a first step-down converter configured to:
      generate a first consumer voltage from the intermediate voltage, the first consumer voltage for supplying a first consumer; and
      receive the intermediate voltage from the temporary store;
   a second step-down converter configured to:
      generate a second consumer voltage from the intermediate voltage, the second consumer voltage for supplying a second consumer; and
      receive the intermediate voltage from the temporary store; and
   a control circuit configured to control the step-up converter, the first step-down converter and the second step-down converter.

2. The supply circuit according to claim 1, further comprising:
   a first switch configured to connect the first consumer with a supply node of the battery; and
   a second switch configured to connect the second consumer with a supply node of the battery.

3. The supply circuit according to claim 1, further comprising:
   a first switch configured to connect the first consumer with the first consumer voltage; and
   a second switch configured to connect the second consumer with the second consumer voltage.

4. The supply circuit according to claim 1, further comprising at least one switch configured to connect a supply node of the first consumer voltage with a supply node of the second consumer voltage.

5. The supply circuit according to claim 1, wherein the control circuit comprises a superordinate control and a first subordinate control and a second subordinate control, wherein the first subordinate control is configured to actuate the first step-down converter and the second subordinate control is configured to actuate the second step-down converter and the superordinate control is configured to actuate the first subordinate control and the second subordinate control.

6. The supply circuit according to one of claim 1, further comprising a switch configured to connect a supply node of the battery with a supply node of the intermediate voltage.

7. The supply circuit according to claim 1, further comprising a housing configured to receive the supply circuit and a connection of the housing configured to connect an external temporary store.

8. The supply circuit according to claim 1, wherein a test circuit is provided for measuring the first consumer voltage and the second consumer voltage.

9. The supply circuit according to claim 1, further comprising a third step-down converter configured to generate a third consumer voltage for supplying a third consumer from the intermediate voltage, wherein a voltage level of the third consumer voltage set independently of the first consumer voltage and the second consumer voltage.

10. A method for operating a supply circuit in a vehicle, comprising:
generating a battery supply voltage with a battery;
generate an intermediate voltage from the battery supply voltage with a step-up converter;
storing and supplying electrical energy with a temporary store from the intermediate voltage, wherein the supply circuit is disposed inside a housing, and wherein the temporary store comprises a first electrical energy storage internal to the housing and a second electrical energy storage external to the housing;
generating a first consumer voltage from the intermediate voltage with a first step-down converter, wherein the first step-down converter is configured to receive the intermediate voltage from the temporary store;
supplying a first consumer with the first consumer voltage;
generating a second consumer voltage from the intermediate voltage with a second step-down converter, wherein the second step-down converter is configured to receive the intermediate voltage from the temporary store;
supplying a second consumer with the second consumer voltage; and
controlling the step-up converter, the first step-down converter, and the second step-down converter with a control circuit;
supplying the first consumer from the first consumer voltage upon start-up of the vehicle; and
supplying the second consumer from the second consumer voltage upon the start-up of the vehicle.

11. The method according to claim 10, further comprising:
supplying the first consumer from the first consumer voltage; and
ceasing supply to the second consumer.

12. The method for operating according to claim 11, further comprising:
supplying the second consumer from the first consumer voltage and from the second consumer voltage; and
generating the first consumer voltage from the first step-down converter; and
generating the second consumer voltage from the second step-down converter.

13. The method according to claim 11, wherein the second consumer is a door lock mechanism of the vehicle.

14. The method according to claim 11, further comprising supplying the first consumer from the battery voltage; and
supplying the second consumer from the battery voltage.

* * * * *